Figure 1:
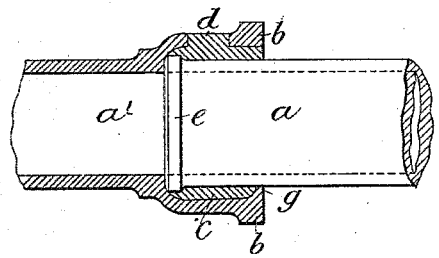

(No Model.)

J. A. EATON.
PIPE COUPLING.

No. 303,132.　　　　　　Patented Aug. 5, 1884.

Witnesses,
George W. Rea
Robert Everett,

Inventor,
James Allan Eaton,
By James L. Norris.
Atty.

UNITED STATES PATENT OFFICE.

JAMES A. EATON, OF LONDON, ENGLAND.

PIPE-COUPLING.

SPECIFICATION forming part of Letters Patent No. 303,132, dated August 5, 1884.

Application filed February 24, 1883. (No model.) Patented in England October 27, 1881, No. 4,696.

*To all whom it may concern:*

Be it known that I, JAMES ALLAN EATON, of London, England, civil engineer, have invented new and useful Improvements in Pipe-Couplings, (for which I have obtained a patent in Great Britain, No. 4,696, bearing date October 27, 1881,) of which the following is a specification, reference being had to the accompanying drawings.

My invention relates to pipe-couplings, and is designed to facilitate the operation of making the joints of metal or other pipes, and to render such operation more effectual than heretofore.

The said invention is particularly applicable to pipes used for gas, water, drainage, sanitary, and telegraphic purposes; but it is also applicable to other pipes where it is of importance that a tight joint should be made that will not leak either from the inside or from the outside.

The said invention moreover has reference especially to the employment of a sealing material which is non-contracting, in the place of the lead and yarn ordinarily used in making joints, although where economy is not desired I can employ lead with my improved pipe-couplings for making the joints.

The object of the said invention is to obviate the difficulties which have been experienced in making such joints with non-contracting materials, such as "Spence's" metal or "Hutchinson's" metal, with pipe-couplings as usually constructed.

In this specification the term "pipes" is intended to include bends, branches, and all other connections and irregular pieces.

According to my said invention I construct pipe-couplings in the following manner—that is to say: In the case of pipes having spigot and faucet ends, I make the faucet or socket with an aperture or apertures through which the sealing material may be poured in, and with an inwardly-extending flange or studs or projections at one side, the object being to make the end opening in the socket eccentric to the inner diameter of the socket back of such flange or studs to insure the pipes being maintained in their proper position relatively to each other while the joint is being made, thereby obviating the necessity for employing wedges, yarn, or other extraneous means heretofore used for this purpose. When pipes having two spigot ends are to be joined, I employ a loose collar having an inwardly-extending flange or studs or projections on one side at each end, and an aperture or apertures through which the sealing material may be poured in. One end of each pipe is inserted in this collar, and the ends are brought together and the sealing material poured in around them. I construct the faucets or sockets of the pipes, or the said loose collars of various materials according to the nature of the pipes to be joined, and I use non-contracting sealing materials in conjunction with the improved pipe-couplings.

Figure 2:
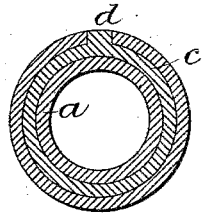
Figure 3:
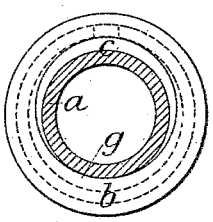
Figure 4:
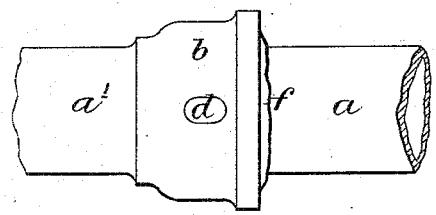
Figure 5:
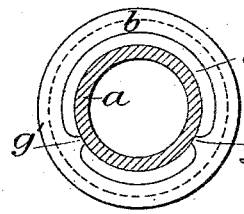
Figure 6:
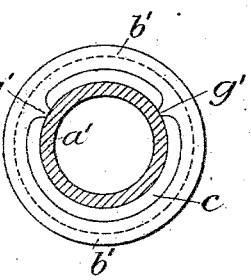
Figure 7:
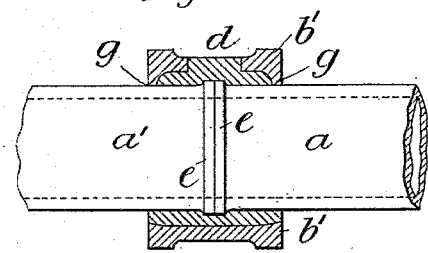
Figure 8:
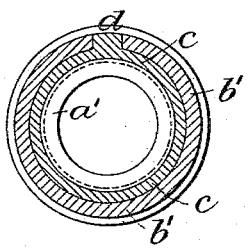
Figure 9:
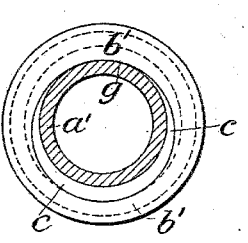
Figure 10:
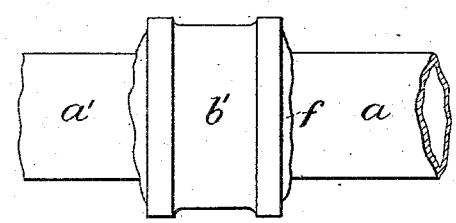
Figure 11:
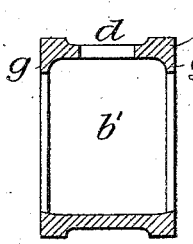
Figure 12:
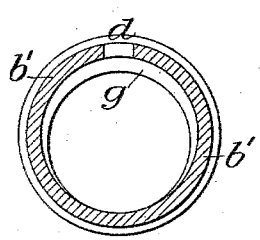

The said invention is illustrated in the accompanying drawings, in which Figure 1 represents a sectional elevation of a pipe-coupling made according to my invention, one of the pipes having a fixed socket. Fig. 2 is a transverse section. Fig. 3 an end elevation, and Fig. 4 a plan of the same. Fig. 5 is an end elevation of a pipe-coupling in which the faucet or socket is provided with studs or projections. Fig. 6 is an end elevation of a pipe-coupling in which I employ a collar with studs or projections. Fig. 7 is a sectional elevation showing the ends of two spigot-pipes coupled by means of a loose collar. Fig. 8 is a transverse section. Fig. 9 an end elevation, and Fig. 10 a side elevation of the same. Fig. 11 is a central longitudinal section of a loose collar, and Fig. 12 is a central transverse section of the same.

Like letters indicate the same parts throughout the drawings.

$a$ represents the spigot end of a pipe; $a'$, the faucet end of a pipe; $b$, the faucet or socket; $b'$, a loose collar, serving instead of a faucet or socket; $c$, the sealing material; $d$, the aperture in the socket or collar through which the sealing material is to be poured in; $e$, a fillet or bead on the spigot end of the pipe, and $f$ represents clay placed at the end or ends of a socket or collar when the joint is being made. $g$ is the flange, and $g'$ $g'$ are the studs or projections. The spigot end $a$ of one pipe is inserted in the improved socket $b$ of the other pipe until it abuts against the inner end of the socket and rests upon the flange $g$, as shown in Fig. 1. This flange forms an aperture at the outer end of the socket eccentric to the inner diameter of the socket back of such flange, and retains the pipes in their proper position relatively to each other. I then put clay around the pipe at the outer end of the socket in the ordinary manner, and I pour in the sealing material through the aperture $d$. The material as it is poured in passes around both sides of the pipe and forms a tight joint free from air-holes and other defects usual in the joints of pipe-couplings, as heretofore made.

In joining two spigot-ended pipes I slip the loose collar $b'$ over the end of one of the pipes to be joined, and I then place the ends of the pipes together, if necessary passing a thin strip of brown paper or other suitable material around the junction of the two pipes, and then slip the loose collar into the position shown in Fig. 7, and having put the clay around the pipe at the ends of the collar I pour in the sealing material through the hole $d$ at the top, and when the material is set I remove the clay and the joint is made. If lead is to be used as the sealing material, I form studs or projections $g'$ on the inside of the socket, as shown in Figs. 5 and 6, instead of forming an internal flange thereon, to permit the setting-up or calking to be effected, which studs make the end openings in the socket eccentric to the inner diameter of the socket back of said studs. The said eccentric openings are of sufficient size and the said studs are so placed as to allow the spigot end of a pipe with a fillet or bead to be inserted in the said sockets or loose collars.

The number of apertures in the socket or collar and their position depend upon the length of the said socket or collar and the pressure which it is required to sustain. These apertures permit the sealing material to be poured into the socket or collar in such a manner as to allow the escape of the air therefrom and keep all the material in a molten state while the joint is being made. The sealing materials which I prefer to employ are sulphur or its compounds, (more especially what are known as "Spence's" or "Hutchinson's" metal,) cement, and other non-contracting materials.

The ends of the pipes may be made with or without a fillet or bead, as desired, and the ends of the pipes may be either at right angles to their axes or with a slight bevel to facilitate making a joint in a slight deviation from the straight line.

By making the end openings eccentric, as described, the coupling can be used for different size pipes, and a space will be maintained on all sides of the pipe within the coupling to insure the complete sealing of the joint. The flange which forms the eccentric will also serve to hold the pipes in the proper relative position to each other while the joint is being made.

By my invention I am enabled to make a perfectly tight joint in a more economical manner than has heretofore been practicable.

I am aware that in pipe-couplings a pipe having a socket with an opening through its face has been combined with a pipe fitting into the socket, and provided with projections on that part of its face which is within the sockets; but in such cases both pipes have to be specially constructed, while such is not the case in my invention, for I provide a socket with a projection on its inside face, and also form an aperture through its face, so that the ordinary construction of pipe may be used.

What I claim is—

1. In a pipe-coupling, a faucet or socket provided with an aperture in its face for the purpose specified, and with an inwardly-extending projection for making the end openings in the socket eccentric to the inner diameter of socket back of such projection, and retaining the pipes in their proper relative position, substantially as described.

2. The combination of the pipes, the coupling having the aperture $d$ in its face, and an inwardly-extending projection, and the sealing material, substantially as described.

In testimony whereof I have hereunto signed my name in the presence of two subscribing witnesses.

JAMES ALLAN EATON.

Witnesses:
   Js. EDW. BEESLEY,
   F. H. LITTLEHALE.
*Both of 2 Pope's Head Alley, Cornhill, London, E. C.*